(12) United States Patent
Li et al.

(10) Patent No.: US 12,254,555 B2
(45) Date of Patent: Mar. 18, 2025

(54) SINGLE PASS ANTI-RINGING CLAMPING ENABLED IMAGE PROCESSING

(71) Applicant: QUALCOMM Incorporated, San Diego, CA (US)

(72) Inventors: Liang Li, San Diego, CA (US); Andrew Evan Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 18/194,324

(22) Filed: Mar. 31, 2023

(65) Prior Publication Data
US 2024/0331079 A1 Oct. 3, 2024

(51) Int. Cl.
*G06T 15/04* (2011.01)
*G06V 10/54* (2022.01)
*G06T 7/40* (2017.01)

(52) U.S. Cl.
CPC .............. *G06T 15/04* (2013.01); *G06V 10/54* (2022.01); *G06T 7/40* (2013.01)

(58) Field of Classification Search
CPC ....... G06T 15/04; G06T 7/40; G06T 2200/12; G06V 10/54
See application file for complete search history.

(56) References Cited

U.S. PATENT DOCUMENTS

| 6,707,952 B1 | 3/2004 | Tan et al. | |
| 8,095,746 B1 * | 1/2012 | Wilt | G06F 12/0292 |
| | | | 345/619 |
| 8,212,835 B1 * | 7/2012 | Migdal | G06T 15/04 |
| | | | 345/587 |
| 2005/0219256 A1 * | 10/2005 | Donovan | G06T 15/04 |
| | | | 345/586 |
| 2009/0160869 A1 * | 6/2009 | Smelyanskiy | G06T 15/04 |
| | | | 345/582 |
| 2015/0199825 A1 * | 7/2015 | Capens | G06T 1/60 |
| | | | 345/582 |
| 2019/0320206 A1 * | 10/2019 | Alakuijala | H04N 19/91 |

FOREIGN PATENT DOCUMENTS

GB 2488591 A 9/2012

OTHER PUBLICATIONS

International Search Report and Written Opinion—PCT/US2024/020449—ISA/EPO—Jul. 11, 2024.

* cited by examiner

*Primary Examiner* — Maurice L. McDowell, Jr.
(74) *Attorney, Agent, or Firm* — Procopio, Cory, Hargreaves & Savitch

(57) ABSTRACT

This disclosure provides systems, devices, apparatus, and methods, including computer programs encoded on storage media, for single pass anti-ringing clamping enabled image processing. A graphics processor may perform a filtering operation on a set of texture samples. The graphics processor may select, during a single sampling operation, a minimum value and a maximum value associated with the set of texture samples during the performance of the filtering operation on the set of texture samples. The graphics processor may adjust, during the single sampling operation, a value of a filtered texture sample associated with the set of texture samples based on the minimum value and the maximum value. The graphics processor may output an indication of the adjusted value of the filtered texture sample.

30 Claims, 11 Drawing Sheets

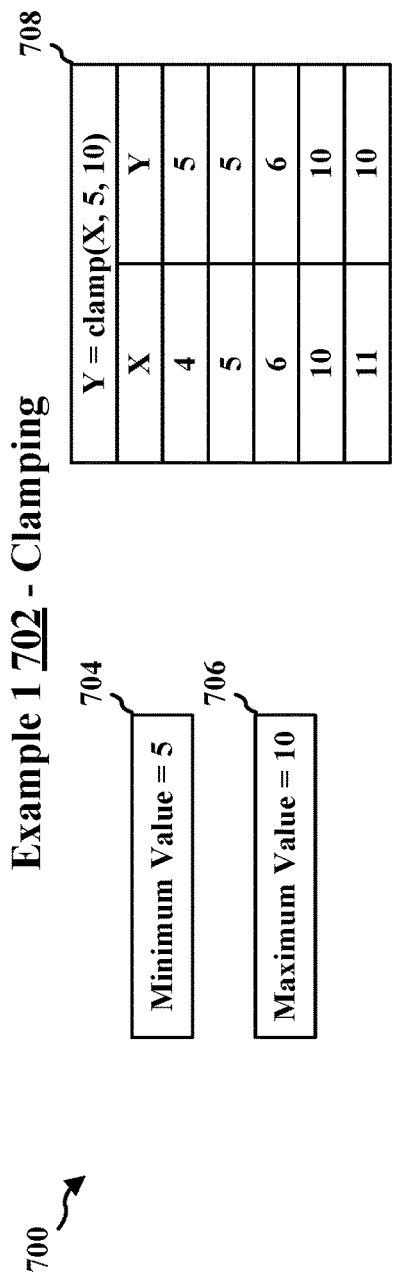
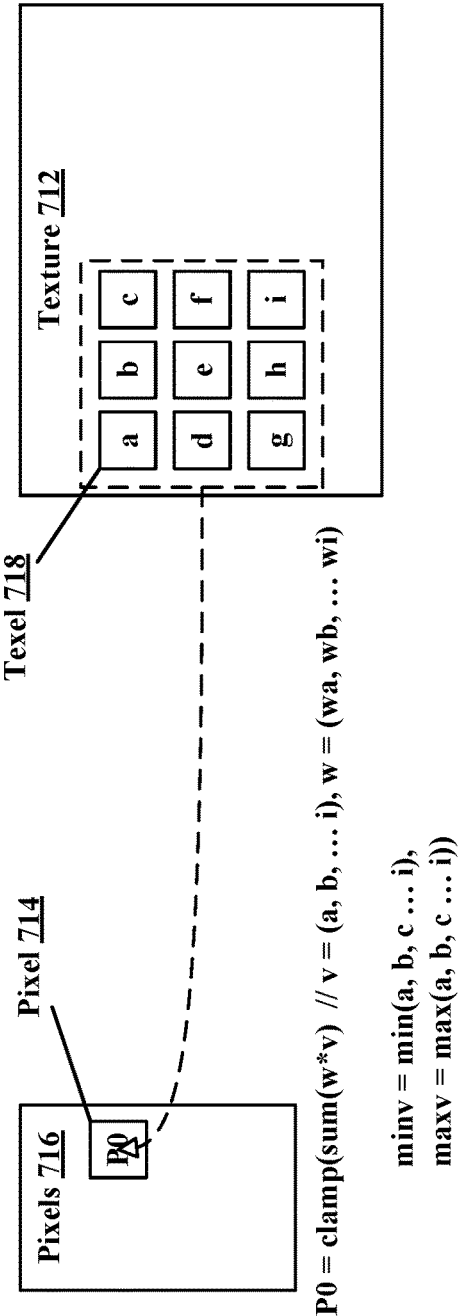
FIG. 7

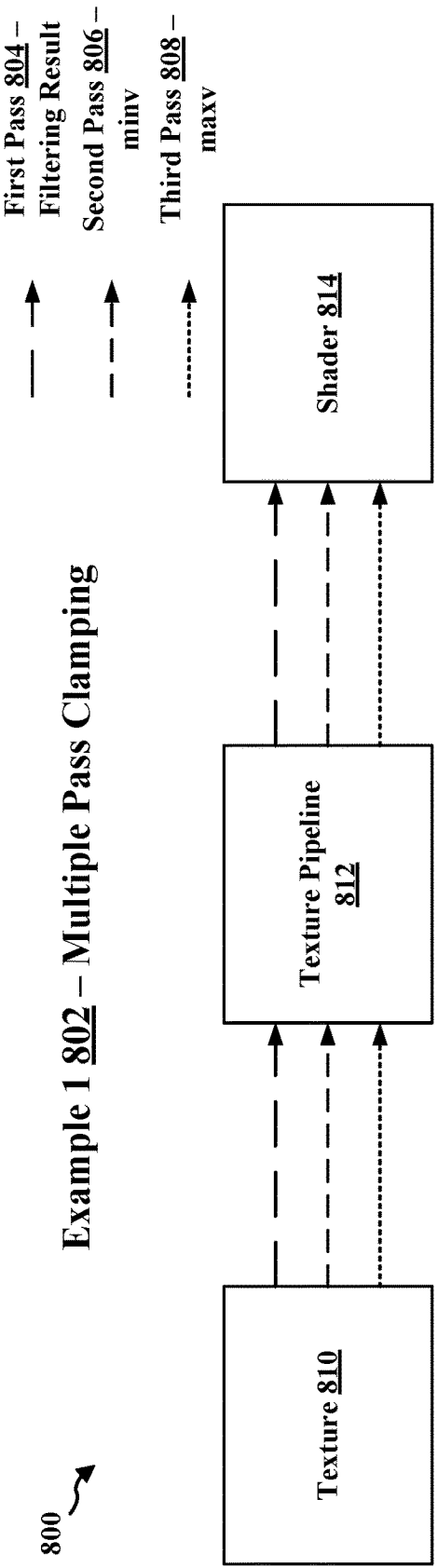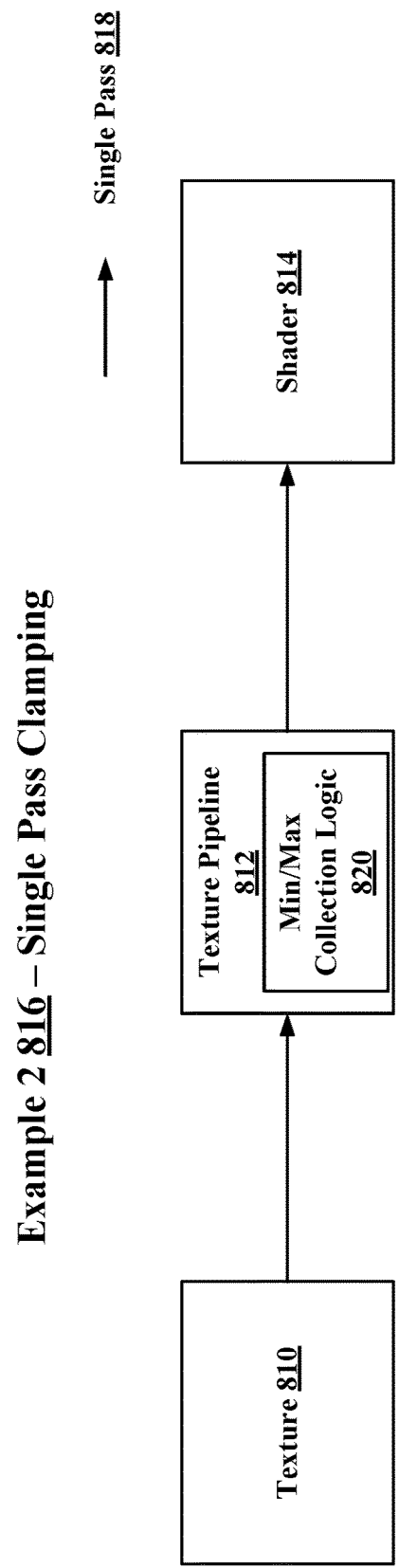
FIG. 8

SINGLE PASS ANTI-RINGING CLAMPING ENABLED IMAGE PROCESSING

TECHNICAL FIELD

The present disclosure relates generally to processing systems, and more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques for clamping (e.g., anti-ringing clamping) may employ multiple passes to clamp values associated with filtered texture samples. There is a need for improved techniques pertaining to clamping.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus includes a memory; and at least one processor coupled to the memory and, based at least in part on information stored in the memory, the at least one processor is configured to perform a filtering operation on a set of texture samples; select, during a single sampling operation, a minimum value and a maximum value associated with the set of texture samples during the performance of the filtering operation on the set of texture samples; adjust, during the single sampling operation, a value of a filtered texture sample associated with the set of texture samples based on the minimum value and the maximum value; and output an indication of the adjusted value of the filtered texture sample.

To the accomplishment of the foregoing and related ends, the one or more aspects include the features hereinafter fully described and particularly pointed out in the claims. The following description and the annexed drawings set forth in detail certain illustrative features of the one or more aspects.

These features are indicative, however, of but a few of the various ways in which the principles of various aspects may be employed, and this description is intended to include all such aspects and their equivalents.

BRIEF DESCRIPTION OF THE DRAWINGS

FIG. 7 is a diagram illustrating example aspects of clamping in accordance with one or more techniques of this disclosure.

FIG. 8 is a diagram illustrating examples of multiple pass clamping and single pass clamping in a texture pipeline in accordance with one or more techniques of this disclosure.

DETAILED DESCRIPTION

Figure 1:
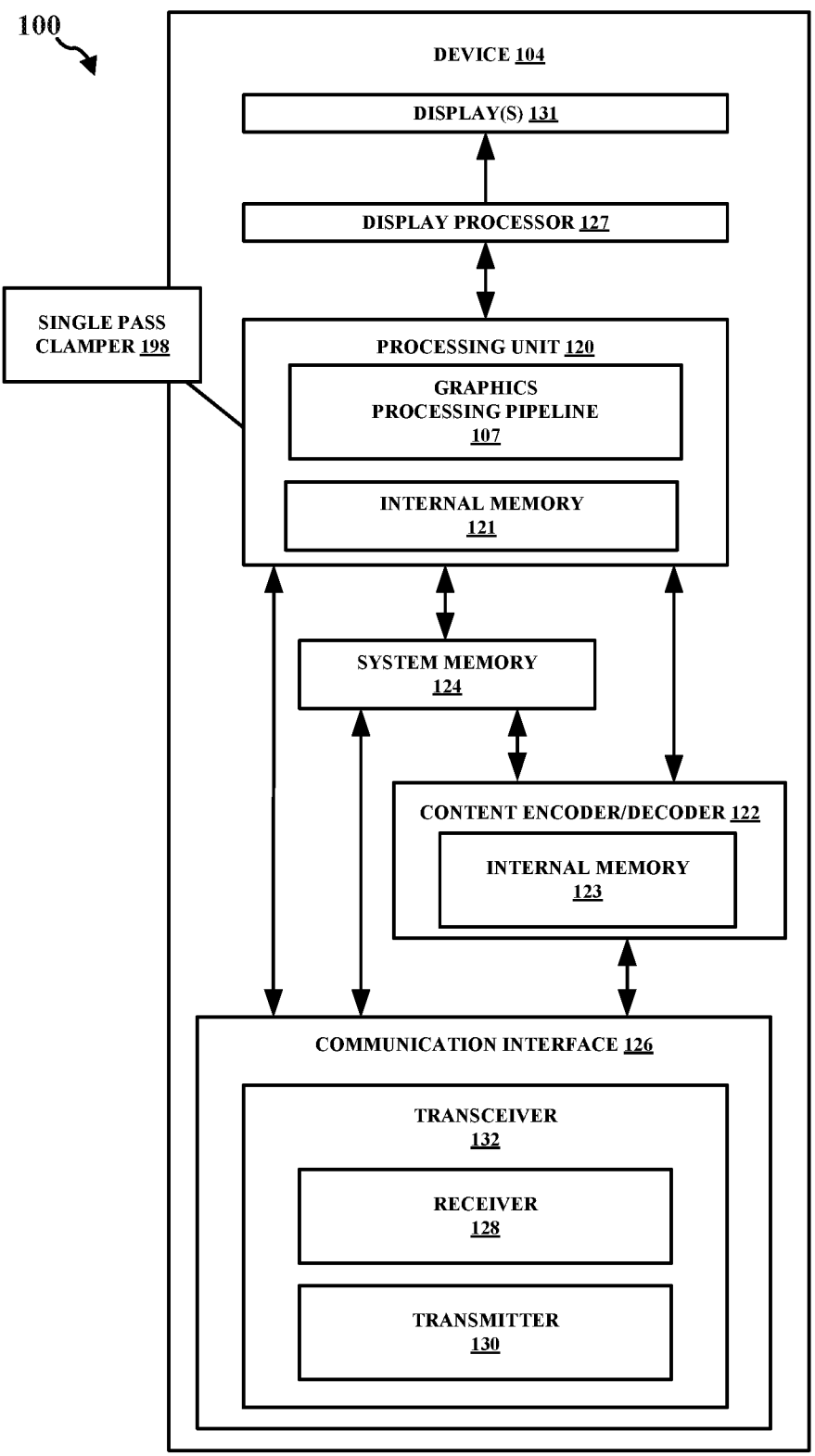
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

A graphics processor (e.g., a GPU or another device) may perform clamping on a value in order to restrict the value to a given range of values defined by a minimum value and a maximum value. Clamping may also be utilized to remove a ringing artifact from an image. A ringing artifact may refer to an artifact in an image that appears as spurious signals near a sharp transition in the image. Visually, a ringing artifact may appear as a band or as "ghosting" near edges in the image. Some graphics processors may perform clamping via multiple passes: a first pass to perform filtering on a texture including texels, a second pass to select a minimum value for the texels associated with the filtering, and a third pass to select a maximum value for the texels associated with the filtering. Values associated with the texels may then be clamped based on the minimum value and the maximum value. Multiple pass clamping may be associated with relatively high computational overhead and/or relatively high power consumption at the graphics processor.

Various technologies pertaining to single pass anti-ringing clamping are described herein. In an example, an apparatus (e.g., a graphics processor) performs a filtering operation on a set of texture samples. The apparatus selects, during a single sampling operation, a minimum value and a maximum value associated with the set of texture samples during the performance of the filtering operation on the set of texture samples. The apparatus adjusts (e.g., clamps), during the single sampling operation, a value of a filtered texture sample associated with the set of texture samples based on the minimum value and the maximum value. The apparatus outputs an indication of the adjusted value of the filtered texture sample. Vis-à-vis selecting the minimum value and the maximum value associated with the set of texture samples during the single sampling operation and adjusting the value of the filtered texture sample during the single sampling operation, the above-described technologies may enable clamping to be performed in a manner associated with reduced computational overhead and/or reduced power consumption in comparison to multiple pass clamping. Furthermore, the above-described technologies may remove or mitigate ringing artifacts in a more efficient manner compared to multiple pass clamping.

The examples describe herein may refer to a use and functionality of a graphics processing unit (GPU). As used herein, a GPU can be any type of graphics processor, and a graphics processor can be any type of processor that is designed or configured to process graphics content. For example, a graphics processor or GPU can be a specialized electronic circuit that is designed for processing graphics content. As an additional example, a graphics processor or GPU can be a general purpose processor that is configured to process graphics content.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, a GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a single pass clamper 198 configured to perform a filtering operation on a set of texture samples; select, during a single sampling operation, a minimum value and a maximum value (e.g., if the set of texture samples includes values such as 2, 6, 8, and 10, the single pass clamper 198 may select 2 as the minimum value and 10 as the maximum value) associated with the set of texture samples during the performance of the filtering operation on the set of texture samples; adjust, during the single sampling operation, a value of a filtered texture sample associated with the set of texture samples based on the minimum value and the maximum value; and output an indication of the clamped value of the filtered texture sample. Although the following description may be focused on graphics processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit or bits that indicate which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
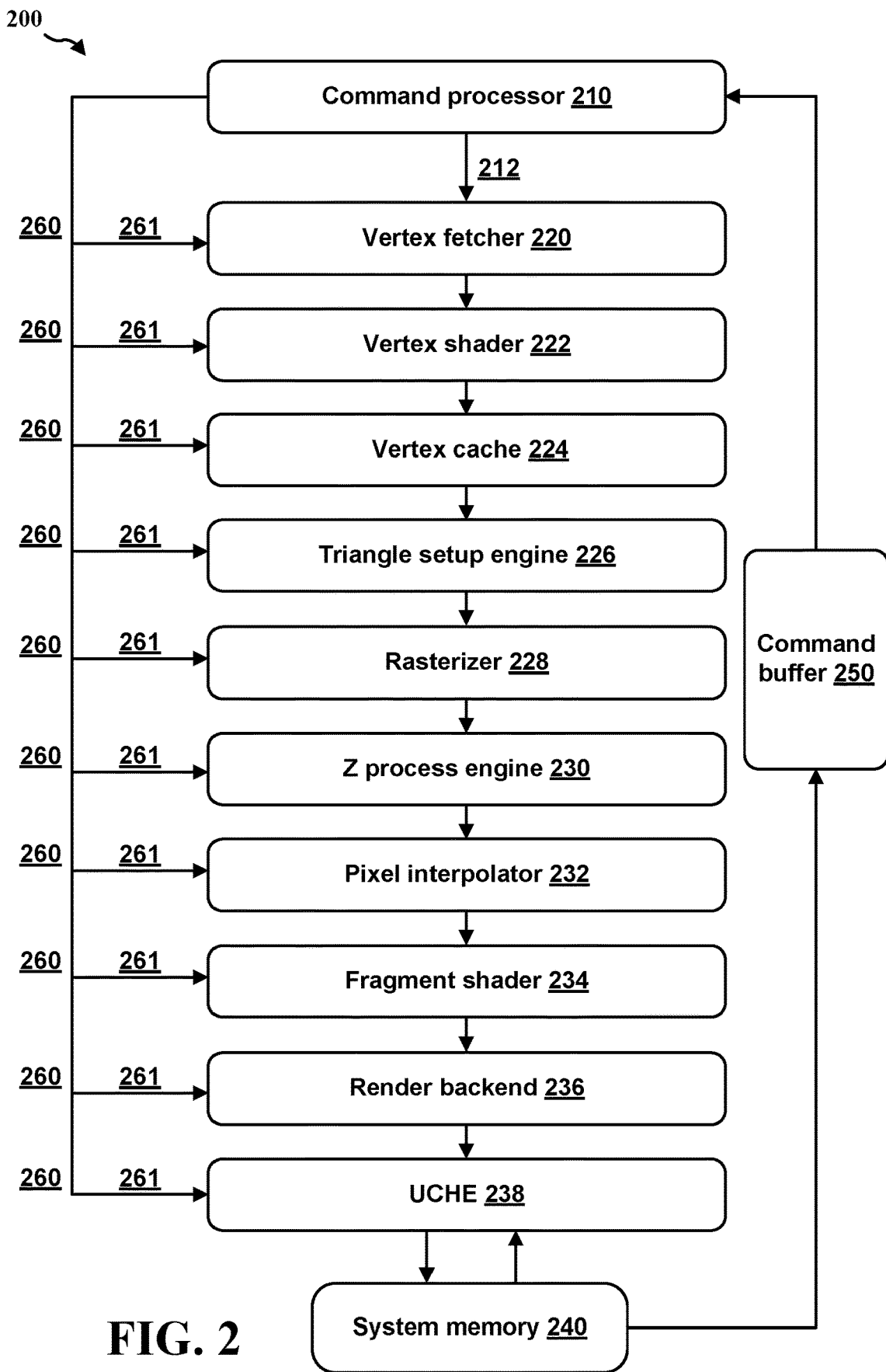
FIG. 2 illustrates an example graphics processor (e.g., a graphics processing unit (GPU)) in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call packets 212 through separate paths to the processing units or blocks in the GPU. Further, the command buffer 250 can alternate different states of context registers and draw calls. For example, a command buffer can simultaneously store the following information: context register of context N, draw call(s) of context N, context register of context N+1, and draw call(s) of context N+1.

GPUs can render images in a variety of different ways. In some instances, GPUs can render an image using direct rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects of tiled rendering, during a binning pass, an image can be divided into different bins or tiles. In some aspects, during the binning pass, a visibility stream can be constructed where visible primitives or draw calls can be identified. A rendering pass may be performed after the binning pass. In contrast to tiled rendering, direct rendering does not divide the frame into smaller bins or tiles. Rather, in direct rendering, the entire frame is rendered at a single time (i.e., without a binning pass). Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible so that the non-visible primitives are not rendered, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a binning, a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory and used to remove primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
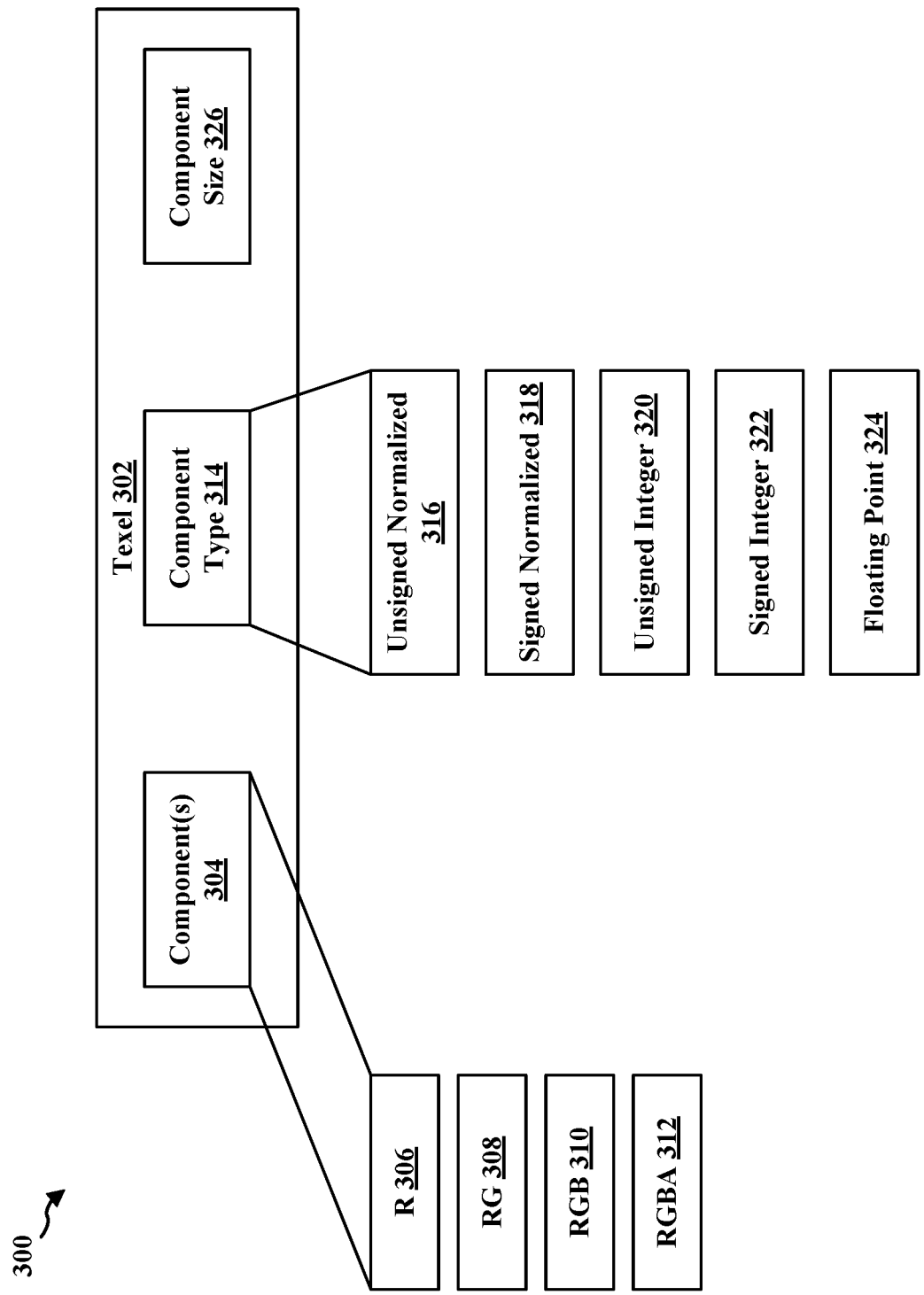
FIG. 3 is a diagram illustrating example aspects of a texture pixel (i.e., a texel) in accordance with one or more techniques of this disclosure.

FIG. 3 is a diagram 300 illustrating example aspects of a texel 302. The texel 302 may be a fundamental unit of a texture map. A texture map may be an image that includes texels (e.g., the texel 302, as well as additional texels that may be the same as the texel 302 or different from the texel 302) that is applied (i.e., mapped) to a surface of a shape, polygon, or three-dimensional (3D) model in order to add color and/or detail to the surface of the shape, the polygon, or the 3D model. The texture map may also be referred to as a texture. A GPU may perform texture mapping in order to map texel(s) to appropriate pixels in a geometric fragment (e.g., a triangle) in an output image. Texture mapping may involve sampling the texture map (i.e., "texture sampling") for one or more texels (e.g., the texel 302). Texture mapping may enable the GPU to simulate near-photorealism in real-time. In an example, a texture map may represent "bricks" and the GPU may perform texture mapping with respect to a rectangle in order to make a resultant image appear as a brick wall. The texel 302 may also be referred to as a texture element or a texture pixel.

The texel 302 may include component(s) 304. In one example, the texel 302 may include a red component (R 306). In another example, the texel 302 may include a red component and a green (G) component (RG 308). In yet another example, the texel 302 may include a red component, a green component, and a blue (B) component (RGB 310). In a further example, the texel 302 may include a red component, a green component, a blue component, and an alpha (A) component (RGBA 312). Other configurations of the component(s) 304 may be possible (e.g., RB, G, etc.). Additionally, in some aspects, the texel 302 may include more than four components. In an example, the texel 302 may include RGBA 312. A shader may request one or more components (e.g., a R component) for the texel 302 and packing (explained in greater detail below) may be based on the requested one or more components (e.g., the R component).

Each of the component(s) 304 of the texel 302 may be associated with a value having a type (i.e., a component type 314). The component type 314 may be unsigned normalized 316. In unsigned normalized 316, each of the component(s) 304 may be stored as a floating-point value in the range of [0, 1]. The component type 314 may be signed normalized 318. In signed normalized 318, each of the component(s) 304 may be stored as a floating-point value in the range of [−1, 1]. The component type 314 may be unsigned integer 320. In unsigned integer 320, each of the component(s) 304 may be stored as an unsigned integer. The component type 314 may be signed integer 322. In signed integer 322, each of the component(s) 304 may be stored as a signed integer, where the signed integer may be a 2's complement integer value. The component type 314 may be floating point 324. In floating point 324, each of the component(s) 304 may be stored as a floating point number.

Each of the component(s) 304 of the texel 302 may have an associated size (i.e., a component size 326) in bits. In an example, the component size 326 may be 2 bits, 4 bits, 5 bits, 8 bits, 10 bits, 12 bits, 16 bits, or 32 bits. In some aspects, the component(s) 304 and/or the component type 314 of the texel 302 may control the component size 326 of the texel 302. The component size 326 may also be referred to as a bitdepth.

In one example, the texel 302 may include a R component that includes 8 bits that represent a signed integer. In another example, the texel 302 may include a R component and a G component that each include 16 bits that each represent an unsigned integer. In yet another example, the texel 302 may include a R component, a G component, a B component, and an A component that each include 32 bits that each represent a floating point number.

Figure 4:
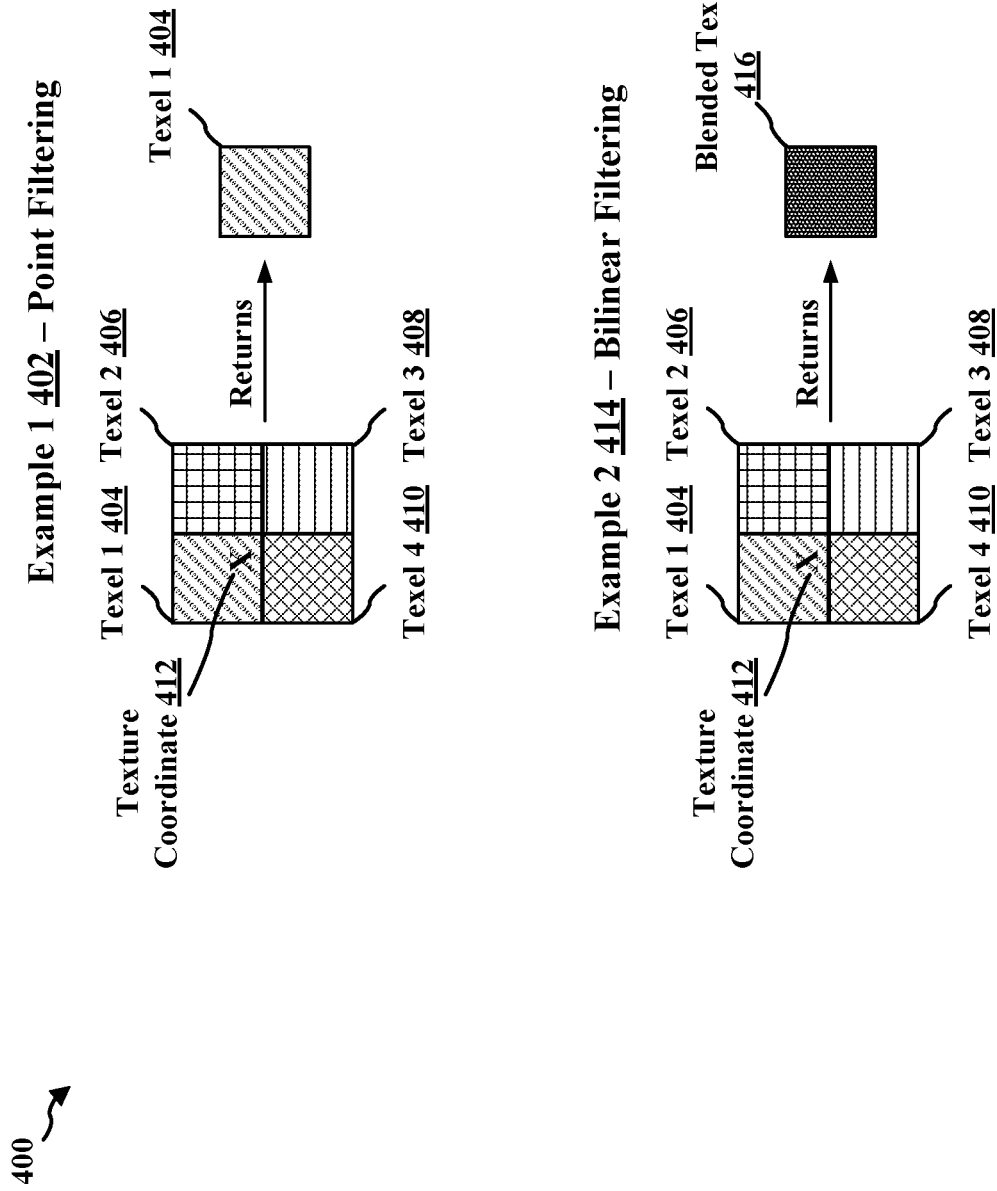
FIG. 4 is a diagram illustrating example aspects of texture filtering including point filtering and bilinear filtering in accordance with one or more techniques of this disclosure.

FIG. 4 is a diagram 400 illustrating example aspects of texture filtering including point filtering and bilinear filtering. Texture filtering may refer to a technique performed by a GPU (or another device) that is used to determine a texture color for a texture mapped pixel using colors of nearby texels (e.g., the texel 302), and optionally other information. Texture filtering may describe how a texture is applied at different shapes, sizes, angles, and scales. In an example, a GPU (or another device) may perform texture sampling to retrieve one or more texels from a texture map and the GPU may perform texture filtering on the one or more texels in order to produce a result of the texture sampling, where the result may be a combination of components of the one or more texels.

A GPU (or another device) may perform a texture mapping process for a two-dimensional (2D) or 3D surface in order to determine where each pixel center falls on a texture. In an example, each pixel may be associated with one or more primitives (e.g., triangles) and a set of barycentric coordinates that are used to provide a position within a texture. Texture filtering may be employed to account for scenarios in which a position does not align exactly on a pixel grid. For instance, a textured surface may be at an arbitrary distance and orientation relative to a viewer, and as a result, one pixel may not correspond to one texel. In one example, a viewer may be at a viewing distance where one pixel is the same as one texel. In another example, the viewer may be at a viewing distance where a texel is larger than a pixel, and hence the texel may be scaled up (i.e., "texture magnification"). In yet another example, the viewer may be at a viewing distance where a texel is smaller than a pixel such that one pixel may cover more than one texel, and hence a color may be selected based on the more than one texel (i.e., "texture minification"). Even if the viewer is at a viewing distance where one pixel is the same as one texel, a pixel may not match up exactly to one texel (e.g., the pixel may be misaligned, rotated, and/or may cover parts of neighboring texels) and hence texture filtering may still be utilized. Texture filtering may reduce artifacts and/or "blurriness" in a displayed image.

In a first example 402, a GPU (or another device) may perform point filtering (i.e., a type of texture filtering). Point filtering may also be referred to as nearest neighbor point filtering. In point filtering, the GPU may select a texel having a center closest to a texture coordinate and output the selected texel. For instance, in the first example 402, the GPU may sample a first texel 404, a second texel 406, a third texel 408, and a fourth texel 410 (i.e., the GPU may perform point sampling) based on a texture coordinate 412 (indicated by an "X" in the first example 402) obtained by the GPU. Stated differently, the GPU may sample neighboring texels (e.g., four texels) of the texture coordinate 412. In an example, the first texel 404 may be the texel 302. The GPU may select and output the first texel 404 as the first texel 404 has a center that is closest to the texture coordinate 412 in comparison to centers of the second texel 406, the third texel 408, and the fourth texel 410. Alternatively, the GPU may also sample the first texel 404 based on the texture coordinate 412 without sampling the second texel 406, the third texel 408, and the fourth texel 410.

In a second example 414, a GPU (or another device) may perform bilinear filtering (i.e., a type of texture filtering). In bilinear filtering, the GPU may sample neighboring texels (e.g., four texels) of the texture coordinate 412. For instance, the GPU may sample the first texel 404, the second texel 406, the third texel 408, and the fourth texel 410 (i.e., the GPU may perform bilinear sampling) based on the texture coordinate 412. The GPU may calculate an interpolated value from each of the first texel 404, the second texel 406, the third texel 408, and the fourth texel 410 and output a blended texel 416. In an example, the interpolated value may be based upon the component(s) 304, the component type 314, and the component size 326 of the texel 302 (as well as corresponding contributions from the second texel 406, the third texel 408, and the fourth texel 410).

An amount of contribution of each of the first texel 404, the second texel 406, the third texel 408, and the fourth texel 410 to the interpolated value of the blended texel 416 may be based on a distance of the texture coordinate from each of the centers of the first texel 404, the second texel 406, the third texel 408, and the fourth texel 410. In an example, the first texel 404 may contribute a relatively greater amount to the blended texel 416 as a center of the first texel 404 is relatively close to the texture coordinate 412 and the third texel 408 may contribute a relatively lesser amount to the blended texel 416 as a center of the third texel 408 is relatively far away from the texture coordinate 412. In an example, calculating the interpolated value of the blended texel 416 may involve computing a weighted average (or some other representative value) of components of each of the first texel 404, the second texel 406, the third texel 408, and the fourth texel 410. In comparison to point filtering, bilinear filtering may be associated with reduced aliasing and shimmering; however, bilinear filtering may utilize greater processing power in comparison to point filtering.

Figure 5:
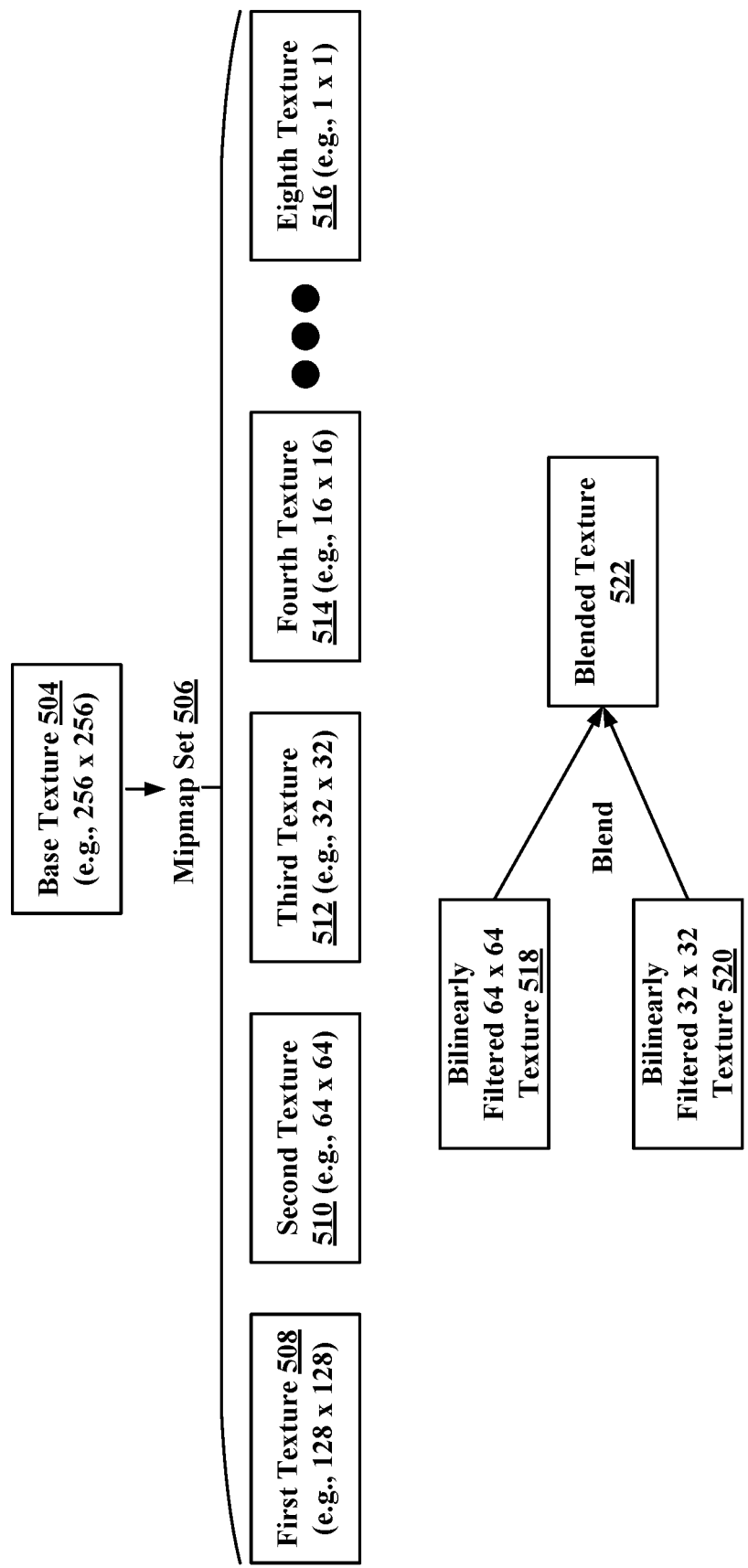
FIG. 5 is a diagram illustrating example aspects of texture filtering including trilinear filtering in accordance with one or more techniques of this disclosure.

FIG. 5 is a diagram 500 illustrating example aspects of texture filtering including trilinear filtering. Trilinear filtering may refer to texture filtering in which a texture lookup is performed, bilinear filtering (e.g., as illustrated in the second example 414) is applied to two closest mipmap levels (explained in greater detail below), and a linear interpolation is performed on the bilinearly filtered mipmap levels. A mipmap may also be referred to as a MIP map or pyramids and may refer to a calculated (e.g., pre-calculated)

optimized sequence of images, each of which may be a progressively lower resolution representation of a previous image.

In a third example 502, a GPU (or another device) may perform trilinear filtering. The GPU may obtain a 256×256 base texture 504 (i.e., a 256×256 pixel texture). In an example, the 256×256 base texture 504 may include the texel 302. The GPU may compute and/or obtain a mipmap set 506 based on the 256×256 base texture 504. The GPU may also obtain a texture coordinate (e.g., the texture coordinate 412, not shown in FIG. 5). The mipmap set 506 may include a plurality of images, where each of the plurality of images is a downscaled duplicate of the 256×256 base texture 504. In an example, the mipmap set 506 may include a 128×128 first texture 508, a 64×64 second texture 510, a 32×32 third texture 512, a 16×16 fourth texture 514, an 8×8 fifth texture (not depicted in FIG. 5), a 4×4 sixth texture (not depicted in FIG. 5), a 2×2 seventh texture (not depicted in FIG. 5), and a 1×1 eighth texture 516. In an example, the 128×128 first texture 508 may include a reduced level of detail in comparison to the 256×256 base texture 504, the 64×64 second texture 510 may include a reduced level of detail in comparison to the 128×128 first texture 508, and so forth.

The GPU may obtain an indication of a space of pixels in which a scene is to be rendered. In an example, the space of pixels may be 40×40 pixels. The GPU may select a first texture in the mipmap set 506 that is closest to and greater than the space of pixels (40×40 pixels) and a second texture in the mipmap set 506 that is closest to and less than the space of pixels (40×40 pixels). For instance, the GPU may select the 64×64 second texture 510 as a first texture for filtering and the 32×32 third texture 512 as a second texture for filtering. The GPU may perform bilinear filtering (e.g., as described in the second example 414) on the 64×64 second texture 510 and the 32×32 third texture 512 to obtain a bilinearly filtered 64×64 texture 518 and a bilinearly filtered 32×32 texture 520, respectively. The GPU may scale the texture coordinate in order to perform the bilinear filtering on the 64×64 second texture 510 and the GPU may scale the texture coordinate in order to perform the bilinear filtering on the 32×32 third texture 512. The GPU may blend (i.e., linearly interpolate) the bilinearly filtered 64×64 texture 518 and the bilinearly filtered 32×32 texture 520 to obtain a blended texture 522. In comparison to bilinear filtering, trilinear filtering may be associated with a smoother degradation of texture quality as a distance from a viewer decreases.

Although FIGS. 4 and 5 depict examples of point filtering, bilinear filtering, and trilinear filtering, a GPU (or another device) may perform other types of texture filtering in place of or in addition to point filtering, bilinear filtering, and trilinear filtering. The other types of texture filtering may include bicubic filtering, anisotropic filtering, nearest neighbor with mipmapping filtering, linear mipmap filtering, percentage closer filtering, and user-defined filtering.

Some types of filtering (e.g., bilinear filtering, point filtering, trilinear filtering, anisotropic filtering, etc.) may not cause ringing artifacts in an image. For instance, bilinear filtering/point filtering/trilinear filtering/anisotropic filtering may produce an "average value" that is greater than a minimum value input to the filtering and less than a maximum value input to the filtering. However, other types of filtering (e.g., bicubic filtering, user-defined filtering) may cause ringing artifacts in an image. For instance, bicubic filtering and/or user defined filtering may be associated with "lobes" or "weights" that are outside of a range of [0.0 . . . 1.0] which may lead to a ringing artifact.

Figure 6:
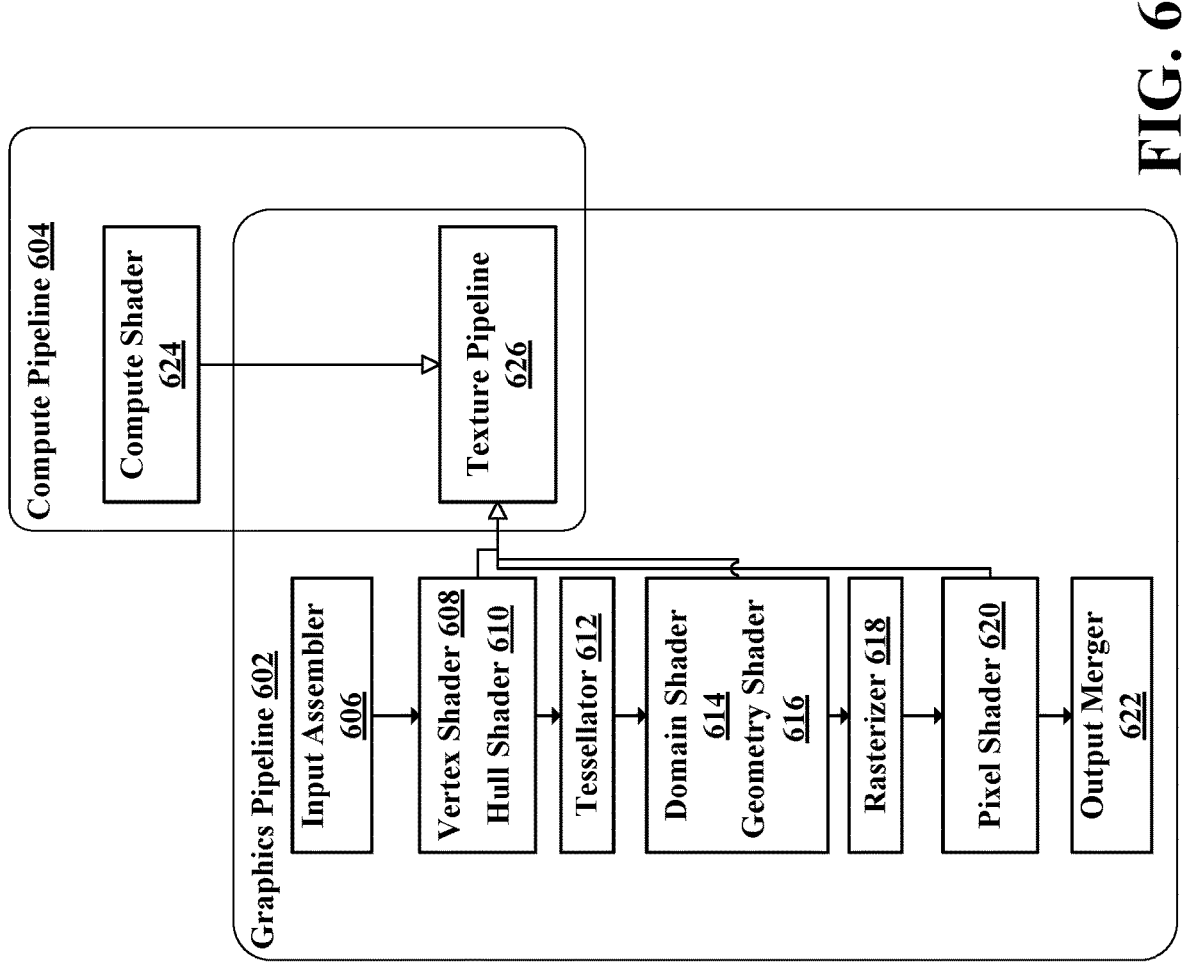
FIG. 6 is a diagram illustrating example aspects of a graphics pipeline and a compute pipeline in accordance with one or more techniques of this disclosure.

FIG. 6 is a diagram 600 illustrating example aspects of a graphics pipeline 602 and a compute pipeline 604. In an example, the graphics pipeline 602 and the compute pipeline 604 may be associated with a GPU (e.g., the GPU 200) of a device (e.g., the device 104). The graphics pipeline 602 may be configured to process graphical data. The compute pipeline 604 may be configured to process arbitrary data (e.g., graphical data and non-graphical data). As used herein, the term "arbitrary data" may refer to "various types of data," "generic data," or "general data." The graphics pipeline 602 and the compute pipeline 604 may work in conjunction with one another to facilitate the presentation of graphical data on a display or displays (e.g., the display(s) 131).

The graphics pipeline 602 may include an input assembler 606. The input assembler 606 may read primitive data (e.g., points, lines, and/or triangles) from buffers and assemble the data into primitives (e.g., triangles) that may be used in subsequent stages of the graphics pipeline 602. The input assembler 606 may assemble vertices into different primitive types, such as line lists, triangle strips, or primitives with adjacency. The input assembler 606 may attach system-generated values that are configured to increase efficiency of shaders (e.g., vertex shaders, geometry shaders, pixel shaders, etc.).

The graphics pipeline 602 may include a vertex shader 608 and/or a hull shader 610. The vertex shader 608 may receive, as input, vertices output from the input assembler 606, where the vertices may include the system-generated values. The vertex shader 608 may perform individual per-vertex processing on the vertices (which may include the system-generated values) that are output from the input assembler 606, such as transformations, skinning, morphing, and per-vertex lighting. The hull shader 610 may also break up a single surface of a model into many triangles. The hull shader 610 may produce a geometry patch and patch constants that correspond to each input patch (e.g., a quad, a triangle, or a line). The hull shader 610 may transform input control points that define a low-order surface into control points that make up a patch. The hull shader 610 may declare a state used in a tessellation stage. The state may include a number of control points, a type of patch face, and a type of partitioning to use for tessellation. The hull shader 610 may output control points (for consumption in a domain-shader stage) and patch constant state (for consumption in a domain shader stage).

The graphics pipeline 602 may include a tessellator 612. The tessellator 612 may receive an output from the vertex shader 608 and/or the hull shader 610. The tessellator 612 may create a sampling pattern of a domain that represents a geometry patch. The tessellator 612 may generate a set of smaller objects (e.g., triangles, points, lines) that connect samples associated with the sampling pattern. The tessellator 612 may operate on a patch based on tessellation factors that specify a degree to which a domain is to be tessellated and based on a type of partitioning (passed from the hull shader 610) that specifies how the patch is to be sliced. The tessellator 612 may output uv (and optionally w) coordinates and a surface topology for a domain shader stage.

The graphics pipeline 602 may include a domain shader 614 and/or a geometry shader 616. The domain shader 614 may calculate vertex positions of subdivided points in an output patch based on input from the hull shader 610 and the tessellator 612. The geometry shader 616 may process entire primitives, such as triangles, lines, points, and adjacent vertices associated with primitives. The geometry shader 616 may output multiple vertices that form a single selected topology, such as a tristrip, a linestrip, or a pointlist.

The graphics pipeline 602 may include a rasterizer 618. The rasterizer 618 may clip primitives that are not in view, prepare primitives for a pixel shader stage, and determine how to invoke pixel shaders. The rasterizer 618 may convert vector information (composed of shapes or primitives) into a raster image (composed of pixels) in order to display real-time 3D graphics. The rasterizer 618 may receive input from the vertex shader 608, the domain shader 614, and/or the geometry shader 616.

The graphics pipeline 602 may include a pixel shader 620. The pixel shader 620 may receive interpolated data for a primitive (e.g., from the rasterizer 618 or another component of the graphics pipeline 602) and generate per-pixel data such as color. The graphics pipeline 602 may include an output merger 622. The output merger 622 may combine various types of output data (e.g., pixel shader values, etc.) with contents of a render target and various buffers to generate an output pipeline result that may be used to display graphical data.

The compute pipeline 604 may include a compute shader 624. The compute shader 624 may be configured to process arbitrary data (e.g., graphical data, non-graphical data, etc.). The compute shader 624 may be utilized for tasks that are not directly related to drawing triangles and pixels.

The graphics pipeline 602 may include a texture pipeline 626. The texture pipeline 626 may be configured to apply textures to shapes, objects, etc. For instance, the texture pipeline 626 may be configured to perform texture mapping. The texture pipeline may also be considered to be part of the compute pipeline 604. The texture pipeline 626 may receive input from the compute shader 624, the vertex shader 608, the hull shader 610, the domain shader 614, the geometry shader 616, and/or the pixel shader 620. The texture pipeline 626 may output data to the pixel shader 620.

FIG. 7 is a diagram 700 illustrating example aspects of clamping in accordance with one or more techniques of this disclosure. A graphics processor (e.g., a GPU or another device) may perform clamping in order to restrict a value to a given range of values. In an example, the graphics processor may utilize clamping to limit a lighting texture to a given maximum value in order to avoid "washing out" detail in bright areas. Clamping may be utilized with different data types, such as floating point numbers, signed integers, and unsigned integers.

In a first example 702, a minimum value 704 used for clamping may be "5" and a maximum value 706 used for clamping may be "10." The diagram 700 includes a table 708 that includes example clamped values. If a value X (e.g., "4") is less than the minimum value 704 (e.g., "5"), a corresponding value Y may be set to the minimum value 704 (e.g., "5"). If a value X (e.g., "5") is equal to the minimum value 704 (e.g., "5"), a corresponding value Y may be set to "5." If a value X (e.g., "6") is greater than the minimum value 704 and less than a maximum value 706 (e.g., "10"), a corresponding value Y may be set to "6." If a value X (e.g., "10") is equal to the maximum value 706 (e.g., "10"), a corresponding value Y may be set to "10." If a value X (e.g., "11") is greater than the maximum value 706 (e.g., "10"), a corresponding value Y may be set to the maximum value 706 (e.g., "10").

In a second example 710, a graphics processor (e.g., a GPU or another device) may utilize clamping in order to remove ringing artifact(s) generated as a byproduct of a filtering operation (e.g., bicubic filtering, user-defined filtering, etc.). As discussed above, texture filtering may refer to a technique performed by a GPU (or another device) that is used to determine a texture color for a texture mapped pixel using colors of nearby texels, and optionally other information. Texture filtering may describe how a texture is applied at different shapes, sizes, angles, and scales. Using clamping to remove ringing artifacts may be referred to as "anti-ringing clamping." A ringing artifact may refer to an artifact in an image that appears as spurious signals near a sharp transition in the image. Visually, a ringing artifact may appear as a band or as "ghosting" near edges in the image. An artifact may refer to an error in a representation of an image introduced by equipment and/or techniques associated with processing the image.

In the second example 710, the graphics processor may sample a texture 712 for one or more texels (illustrated in FIG. 7 as "a," "b," "c," etc.) as part of a filtering operation (e.g., point filtering, bilinear filtering, user-defined filtering, etc.) associated with a pixel 714 in pixels 716 that are to be displayed on a display (e.g., the display(s) 131). The one or more texels may include a texel 718. The texel 718 may be or include the texel 302.

In one aspect, performing a filtering operation may include applying weight(s) to texels e.g., "wa, wb, . . . wi" in FIG. 7). In an example, the weight(s) may be associated with shader(s) and/or a calculated value in a texture pipeline (e.g., the texture pipeline 626). In one example, a shader may calculate the weight(s). In another example, the weight(s) may be based on a texture sample in a texture pipeline.

In an example, the graphics processor may sample texels "a-i" as part of a filtering operation. The graphics processor may multiply a value for each of the texels "a-i" by one or more weights and sum the resultant values to obtain a value for the pixel 714 (i.e., "P0=clamp(sum(w*v))"). The graphics processor may compute a minimum value ("minv=min(a, b, c, . . . i)") and a maximum value ("maxv=max(a, b, c, . . . i)") for the texels "a-i." The graphics processor may then clamp the value for the pixel 714 based on the minimum value and the maximum value.

FIG. 8 is a diagram 800 illustrating examples of multiple pass clamping and single pass clamping in a texture pipeline in accordance with one or more techniques of this disclosure. In a first example 802, a graphics processor (e.g., a GPU or another device) may perform multiple pass clamping in order to remove or mitigate ringing artifact(s). The multiple pass clamping may include a first pass 804, a second pass 806, and a third pass 808. In the first pass 804, hardware logic associated with the graphics processor may perform filtering (i.e., a filtering operation) on a texture 810 in a texture pipeline 812 and the hardware logic may output a result of the filtering to a shader 814 associated with a shader processor. In the second pass 806, the hardware logic associated with the graphics processor may select a minimum value of texels associated with the filtering and the hardware logic may output the minimum value to the shader 814 associated with the shader processor. In the third pass 808, the hardware logic associated with the graphics processor may select a maximum value of texels associated with the filtering and the hardware logic may output the maximum value to the shader 814 associated with the shader processor. The hardware logic associated with the graphics processor may then perform clamping based on the result of the filtering, the minimum value, and the maximum value. As discussed above, multiple pass clamping may be utilized in order to remove or mitigate ringing artifact(s). For instance, during the first pass 804, some types of filtering, such as bicubic filtering, may produce values associated with texture(s) that are outside of a particular range (e.g., [0.0 . . . 1.0]). When the values are outside of the particular range, ringing artifacts may occur when graphical data associated with the texture(s) is displayed. By performing multiple pass clamping, values (e.g., −0.1, 1.1, etc.) that are outside of the particular range may be "clamped" to be within the particular range (e.g., 1.1 may be clamped to 1.0). As a result, when graphical data associated with the texture(s) is displayed, ringing artifacts may be removed or mitigated.

In a second example 816, a graphics processor (e.g., a GPU or another device) may perform single pass clamping in order to remove or mitigate ringing artifact(s). In the second example 816, during a single pass 818, hardware logic associated with the graphics processor may perform filtering on a texture 810 in a texture pipeline 812, min/max collection logic 820 may select a minimum value and a maximum value of texels associated with the filtering, and the hardware logic may output the filtered result, the minimum value, and the maximum value to the shader 814 associated with the shader processor. For instance, during the single pass 818, the hardware logic may compare values associated with the filtering in order to select the minimum value and the maximum value. The hardware logic associated with the graphics processor may then perform clamping based on the result of the filtering, the minimum value, and the maximum value. Alternatively, the hardware logic associated with the graphics processor may perform the clamping in the texture pipeline 812 during the single pass 818 and the hardware logic may output a clamped result to the shader 814. In comparison to the multiple pass clamping of the first example 802, performing clamping utilizing the single pass 818 of the second example 816 may reduce a number of data transactions, thereby reducing power consumption and increasing performance.

Figure 9:
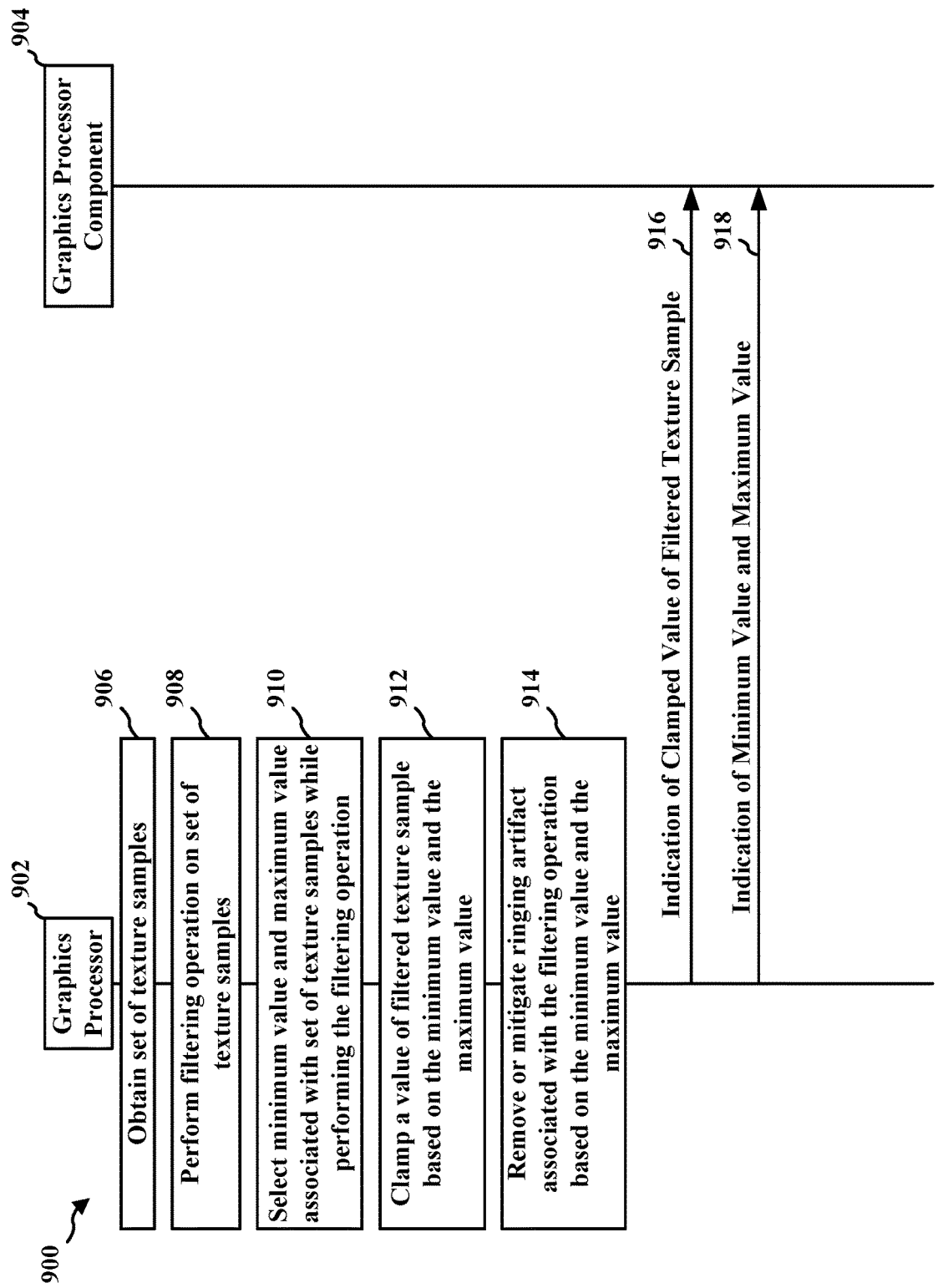
FIG. 9 is a call flow diagram illustrating example communications between a graphics processor and a graphics processor component in accordance with one or more techniques of this disclosure.

FIG. 9 is a call flow diagram 900 illustrating example communications between a graphics processor 902 and a graphics processor component 904 in accordance with one or more techniques of this disclosure. In an example, the graphics processor 902 and the graphics processor component 904 may be included in the device 104. In an example, the graphics processor 902 may be or include the GPU 200. In an example, the graphics processor 902 may be or include a shader processor, such as a shader processor associated with the pixel shader 620.

At 906, the graphics processor 902 may obtain a set of texture samples. The set of texture samples may refer to one or more values obtained from one or more images, one or more functions, or one or more maps, where the one or more values are to be utilized to place details (e.g., color(s)) onto graphical content. The texture samples may include texels (e.g., the texel 302, the texel 718, etc.). At 908, the graphics processor 902 may perform a filtering operation on the set of texture samples. In an example, the filtering operation may be or include bicubic filtering and/or user-defined filtering.

At 910, the graphics processor 902 may select (e.g., during a single sampling operation) a minimum value and a maximum value associated with the set of texture samples while performing the filtering operation. A sampling operation may refer to a process of obtaining one or more values obtained from one or more images, one or more functions, or one or more maps, where the one or more values are to be utilized to place details (e.g., color(s)) onto graphical content. At 912, the graphics processor 902 may clamp (e.g., during the single sampling operation) a value of a filtered texture sample associated with the set of texture samples based on the minimum value and the maximum value. The filtered texture sample may refer to a modified value associated with the set of texture samples, where the modified value is a result of a filtering operation (e.g., bicubic filtering) performed on the set of texture samples. At 914, the graphics processor 902 may remove or mitigate a ringing artifact associated with the filtering operation based on the minimum value and the maximum value. At 916, the graphics processor 902 may output (i.e., transmit) an indication of the clamped value of the filtered texture sample to the graphics processor component 904. At 918, the graphics processor 902 may output an indication of the minimum value and the maximum value to the graphics processor component 904.

Figure 10:
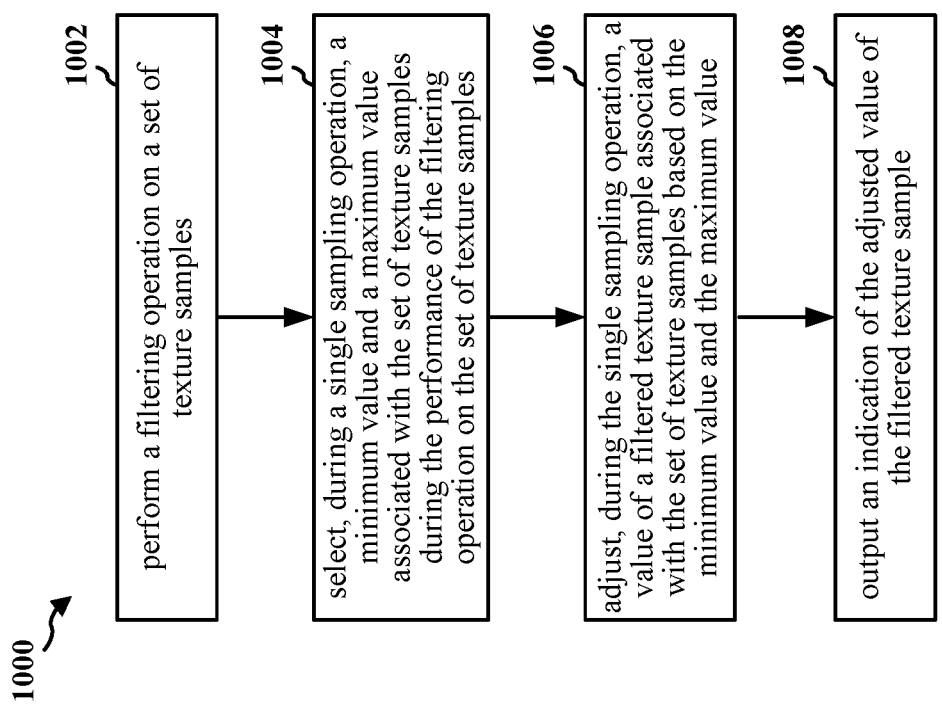
FIG. 10 is a flowchart of an example method of graphics processing in accordance with one or more techniques of this disclosure.

FIG. 10 is a flowchart 1000 of an example method of graphics processing in accordance with one or more techniques of this disclosure. The method may be performed by an apparatus, such as an apparatus for graphics processing, a graphics processor, a GPU, a CPU, a wireless communication device, and the like, as used in connection with the aspects of FIGS. 1-9. In an example, the method may be performed by the single pass clamper 198.

At 1002, the apparatus (e.g., a graphics processor) performs a filtering operation on a set of texture samples. For example, FIG. 9 at 908 shows that the graphics processor 902 may perform a filtering operation on a set of textures samples. In an example, the set of texture samples may be or include the texel 302. In a further example, the filtering operation may be or include point filtering, bilinear filtering, and/or trilinear filtering as in the first example 402, the second example 414, and the third example 502, respectively. In an example, 1002 may be performed by the single pass clamper 198.

At 1004, the apparatus (e.g., a graphics processor) selects, during a single sampling operation, a minimum value and a maximum value associated with the set of texture samples during the performance of the filtering operation on the set of texture samples. For example, FIG. 9 at 910 shows that the graphics processor 902 may select a minimum value and a maximum value associated with the set of texture samples while the graphics processor 902 performs the filtering operation. In an example, the minimum value may be the minimum value 704 and the maximum value may be the maximum value 706. In an example, 1004 may be performed by the single pass clamper 198.

At 1006, the apparatus (e.g., a graphics processor) adjusts, during the single sampling operation, a value of a filtered texture sample associated with the set of texture samples based on the minimum value and the maximum value. For example, FIG. 9 at 912 shows that the graphics processor 902 may clamp a value of a filtered texture sample based on the minimum value and the maximum value. In an example, adjusting the value may include aspects described above in connection with FIG. 7 and/or the second example 816 of FIG. 8. In an example, 1006 may be performed by the single pass clamper 198.

At 1008, the apparatus (e.g., a graphics processor) outputs an indication of the adjusted value of the filtered texture sample. For example, FIG. 9 at 916 shows that the graphics processor 902 may output an indication of the clamped value of the filtered texture sample. In an example, 1008 may be performed by the single pass clamper 198.

Figure 11:
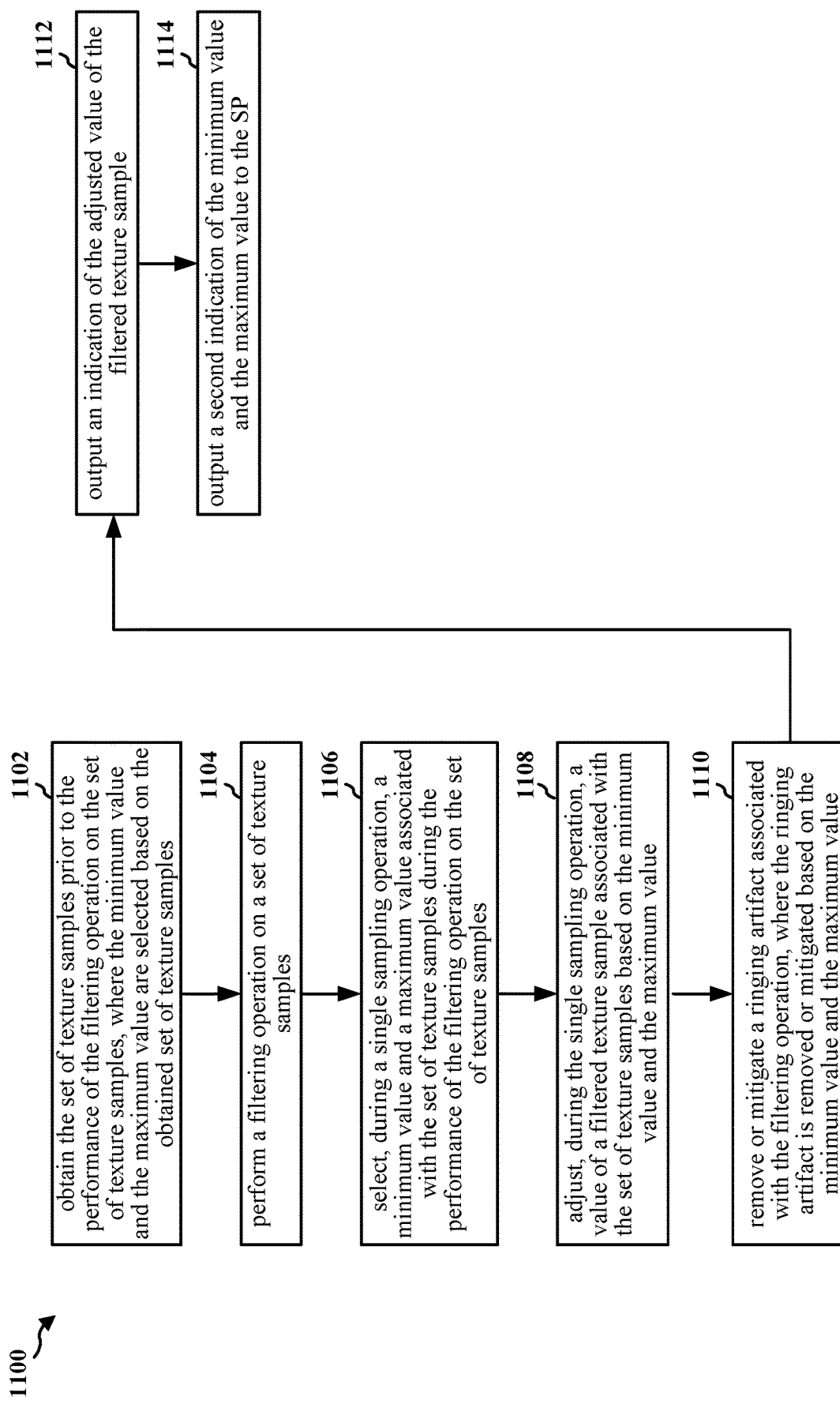
FIG. 11 is a flowchart of an example method of graphics processing in accordance with one or more techniques of this disclosure.

FIG. 11 is a flowchart 1100 of an example method of graphics processing in accordance with one or more techniques of this disclosure. The method may be performed by an apparatus, such as an apparatus for graphics processing, a graphics processor, a GPU, a CPU, a wireless communication device, and the like, as used in connection with the aspects of FIGS. 1-9. In an example, the method (including the various aspects detailed below) may be performed by the single pass clamper 198.

At 1104, the apparatus (e.g., a graphics processor) performs a filtering operation on a set of texture samples. For example, FIG. 9 at 908 shows that the graphics processor 902 may perform a filtering operation on a set of textures samples. In an example, the set of texture samples may be or include the texel 302. In a further example, the filtering operation may be or include point filtering, bilinear filtering, and/or trilinear filtering as in the first example 402, the second example 414, and the third example 502, respectively. In an example, 1104 may be performed by the single pass clamper 198.

At 1106, the apparatus (e.g., a graphics processor) selects, during a single sampling operation, a minimum value and a maximum value associated with the set of texture samples during the performance of the filtering operation on the set of texture samples. For example, FIG. 9 at 910 shows that the graphics processor 902 may select a minimum value and a maximum value associated with the set of texture samples while the graphics processor 902 performs the filtering operation. In an example, the minimum value may be the minimum value 704 and the maximum value may be the maximum value 706. In an example, 1106 may be performed by the single pass clamper 198.

At 1108, the apparatus (e.g., a graphics processor) adjusts, during a single sampling operation, a value of a filtered texture sample associated with the set of texture samples based on the minimum value and the maximum value. For example, FIG. 9 at 912 shows that the graphics processor 902 may clamp a value of a filtered texture sample based on the minimum value and the maximum value. In an example, adjusting the value may include aspects described above in connection with FIG. 7 and/or the second example 816 of FIG. 8. In an example, 1108 may be performed by the single pass clamper 198.

At 1112, the apparatus (e.g., a graphics processor) outputs an indication of the adjusted value of the filtered texture sample. For example, FIG. 9 at 916 shows that the graphics processor 902 may output an indication of the clamped value of the filtered texture sample. In an example, 1112 may be performed by the single pass clamper 198.

In one aspect, at 1110, the apparatus (e.g., a graphics processor) may remove or mitigate a ringing artifact associated with the filtering operation, where the ringing artifact may be removed or mitigated based on the minimum value and the maximum value. For example, FIG. 9 at 914 shows that the graphics processor 902 may remove or mitigate a ringing artifact associated with the filtering operation based on the minimum value and the maximum value. In an example, 1110 may be performed by the single pass clamper 198.

In one aspect, the performance of the filtering operation, the selection of the minimum value and the maximum value, and the adjustment of the minimum value and the maximum value are performed at a texture block in a texture pipeline.

In one aspect, at 1102, the apparatus (e.g., a graphics processor) may obtain the set of texture samples prior to the performance of the filtering operation on the set of texture samples, where the minimum value and the maximum value may be selected based on the obtained set of texture samples. For example, FIG. 9 at 906 shows that the graphics processor 902 may obtain a set of texture samples prior to performing a filtering operation on the set of texture samples at 908. In an example, 1102 may be performed by the single pass clamper 198.

In one aspect, obtaining the set of texture samples may include sampling a texture at one or more locations in a single sampling operation. For example, the second example 816 of FIG. 8 shows that obtaining the set of texture samples may include sampling a texture at one or more locations in a single sampling operation.

In one aspect, adjusting the value of the filtered texture sample may include: clamping the value of the filtered texture sample at a texture pipeline or a shader processor (SP) of a graphics processor. For example, the second example 816 of FIG. 8 shows that adjusting the value of the filtered texture sample may include: clamping the value of the filtered texture sample at a texture pipeline 812 or a shader 814. The shader 814 may be associated with a shader processor.

In one aspect, the value of the filtered texture sample may be clamped at the texture pipeline, and outputting the indication of the adjusted value of the filtered texture sample may include: transmitting the indication from the texture pipeline to the SP. For example, the second example 816 of FIG. 8 shows that the value of the filtered texture sample may be clamped at the texture pipeline 812. In another example, FIG. 9 at 916 shows that the indication of the clamped value may be transmitted to a graphics processor component 904, where the graphics processor component 904 may be or include a shader processor.

In one aspect, the value of the filtered texture sample may be clamped at the SP, and at 1114, the apparatus (e.g., a graphics processor) may output a second indication of the minimum value and the maximum value to the SP. For example, FIG. 9 at 918 shows that the graphics processor 902 may output an indication of the minimum value and the maximum value to the graphics processor component 904, where the graphics processor component 904 may be or include a shader processor. In an example, 1114 may be performed by the single pass clamper 198.

In one aspect, each texture sample in the set of texture samples may include a texel, a texture pixel, or a texture element. For example, the set of texture samples in FIG. 9 may include a texel, a texture pixel, or a texture element.

In one aspect, the filtering operation may include at least one of: bicubic filtering or user-defined filtering. For example, the filtering operation performed at 908 may include bicubic filtering and/or user-defined filtering.

In one aspect, adjusting the value of the filtered texture sample may include: setting the value of the filtered texture sample to the minimum value, setting the value of the filtered texture sample to the maximum value, or refraining from changing the value of the filtered texture sample. For example, the table 708 shows that clamping the value of the filtered texture sample may include: setting the value of the filtered texture sample to the minimum value, setting the value of the filtered texture sample to the maximum value, or refraining from adjusting the value of the filtered texture sample.

In one aspect, a first value of a first filtered texture sample associated with the set of texture samples is less than the minimum value, and adjusting the first value may include setting the first value to the minimum value based on the first value being less than the minimum value. For example, referring to the table 708, the minimum value may be "5," the maximum value may be "10," and the first value may be "4," and clamping the first value may include setting the first value to be equal to "5."

In one aspect, a first value of a first filtered texture sample associated with the set of texture samples is greater than the maximum value, and adjusting the first value may include setting the first value to the maximum value based on the first value being greater than the maximum value. For example, referring to the table 708, the minimum value may be "5," the maximum value may be "10," and the first value may be "11," and clamping the first value may include setting the first value to be equal to "10."

In one aspect, a first value of a first filtered texture sample associated with the set of texture samples is greater than the minimum value and less than the maximum value, and adjusting the first value may include refraining from changing the first value based on the first value being greater than the minimum value and less than the maximum value. For example, referring to the table 708, the minimum value may be "5," the maximum value may be "10," and the first value may be "7," and clamping the first value may include leaving the first value as "7."

In one aspect, a first value of a first filtered texture sample associated with the set of texture samples may be outside of a range defined by the minimum value and the maximum value due to the filtering operation being performed on the set of texture samples. For example, referring to the table 708, the first value may be outside of a range defined by "5" and "10" due to a filtering operation being performed on a set of texture samples.

In one aspect, performing the filtering operation on the set of texture samples may include applying at least one weight to the set of texture samples, and the value of the filtered texture sample may be further based on the at least one weight. For example, applying the at least one weight may include aspects described above in connection to the second example 710 in FIG. 7.

In one aspect, the at least one weight may be associated with at least one of a shader or a calculated value associated with a texture pipeline. For example, the at least one weight may be associated with the shader 814 or the texture pipeline 812 in the second example 816 of FIG. 8.

In one aspect, outputting the indication of the adjusted value of the filtered texture sample may include: transmitting, to a component at a graphics processor or a CPU, the indication of the adjusted value of the filtered texture sample. For example, outputting the indication of the clamped value at 916 may include transmitting the indication of the clamped value to the graphics processor component 904 or a CPU.

In one aspect, outputting the indication of the adjusted value of the filtered texture sample may include: storing, in a memory or a cache at a graphics processor or a CPU, the indication of the adjusted value of the filtered texture sample. For example, outputting the indication of the adjusted value of the filtered texture sample may include storing, in a memory or a cache at a graphics processor or a CPU, the indication of the adjusted value of the filtered texture sample.

In configurations, a method or an apparatus for graphics processing is provided. The apparatus may be a graphics processor (e.g., a GPU), a CPU, or some other processor that may perform graphics processing. In aspects, the apparatus may be the processing unit 120 within the device 104, or may be some other hardware within the device 104 or another device. The apparatus may include means for performing a filtering operation on a set of texture samples. The apparatus may further include means for selecting, during a single sampling operation, a minimum value and a maximum value associated with the set of texture samples during the performance of the filtering operation on the set of texture samples. The apparatus may further include means for adjusting, during the single sampling operation, a value of a filtered texture sample associated with the set of texture samples based on the minimum value and the maximum value. The apparatus may further include means for outputting an indication of the adjusted value of the filtered texture sample. The apparatus may further include means for removing or mitigating a ringing artifact associated with the filtering operation, where the ringing artifact is removed or mitigated based on the minimum value and the maximum value. The apparatus may further include means for obtaining the set of texture samples prior to the performance of the filtering operation on the set of texture samples, where the minimum value and the maximum value are selected based on the obtained set of texture samples. The apparatus may further include means for outputting a second indication of the minimum value and the maximum value to the SP.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may include RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of graphics processing, including: performing a filtering operation on a set of texture samples; selecting, during a single sampling operation, a minimum value and a maximum value associated with the set of texture samples during the performance of the filtering operation on the set of texture samples; adjusting, during the single sampling operation, a value of a filtered texture sample associated with the set of texture samples based on the minimum value and the maximum value; and outputting an indication of the adjusted value of the filtered texture sample.

Aspect 2 is the method of aspect 1 and further includes removing or mitigating a ringing artifact associated with the filtering operation, where the ringing artifact is removed or mitigated based on the minimum value and the maximum value.

Aspect 3 is the method of any of aspects 1-2 and includes that the performance of the filtering operation, the selection of the minimum value and the maximum value, and the adjustment of the value of the filtered texture sample are performed at a texture block in a texture pipeline.

Aspect 4 is the method of any of aspects 1-3 and further includes obtaining the set of texture samples prior to the performance of the filtering operation on the set of texture samples, where the minimum value and the maximum value are selected based on the obtained set of texture samples.

Aspect 5 is the method of aspect 4 and includes that obtaining the set of texture samples includes sampling a texture at one or more locations in the single sampling operation.

Aspect 6 is the method of any of aspects 1-5 and includes that adjusting the value of the filtered texture sample includes: clamping the value of the filtered texture sample at a texture pipeline or a shader processor (SP) of a graphics processor.

Aspect 7 is the method of aspect 6 and includes that the value of the filtered texture sample is clamped at the texture pipeline, where outputting the indication of the adjusted value of the filtered texture sample includes: transmitting the indication from the texture pipeline to the SP.

Aspect 8 is the method of any of aspects 6-7 and includes that the value of the filtered texture sample is clamped at the SP, the method further including: outputting a second indication of the minimum value and the maximum value to the SP.

Aspect 9 is the method of any of aspects 1-8 and includes that each texture sample in the set of texture samples includes a texel, a texture pixel, or a texture element.

Aspect 10 is the method of any of aspects 1-9 and includes that the filtering operation includes at least one of: bicubic filtering or user-defined filtering.

Aspect 11 is the method of any of aspects 1-10 and includes that adjusting the value of the filtered texture sample includes: setting the value of the filtered texture sample to the minimum value, setting the value of the filtered texture sample to the maximum value, setting the value of the filtered texture sample to the value of the filtered texture sample, returning the value of the filtered texture sample, or refraining from adjusting the value of the filtered texture sample.

Aspect 12 is the method of aspect 11 and includes that a first value of a first filtered texture sample associated with the set of texture samples is less than the minimum value, and where adjusting the first value includes setting the first value to the minimum value based on the first value being less than the minimum value.

Aspect 13 is the method of aspect 11 and includes that a first value of a first filtered texture sample associated with the set of texture samples is greater than the maximum value, and where adjusting the first value includes setting the first value to the maximum value based on the first value being greater than the maximum value.

Aspect 14 is the method of aspect 11 and includes that a first value of a first filtered texture sample associated with the set of texture samples is greater than the minimum value and less than the maximum value, and where adjusting the first value includes setting the first value to the first value, returning the first value, or refraining from changing the first value based on the first value being greater than the minimum value and less than the maximum value.

Aspect 15 is the method of any of aspects 1-11 and includes that a first value of a first filtered texture sample associated with the set of texture samples is outside of a range defined by the minimum value and the maximum value due to the filtering operation being performed on the set of texture samples.

Aspect 16 is the method of any of aspects 1-15 and includes that performing the filtering operation on the set of texture samples includes applying at least one weight to the set of texture samples, and where the value of the filtered texture sample is further based on the at least one weight.

Aspect 17 is the method of aspect 16 and includes that the at least one weight is associated with at least one of a shader or a calculated value associated with a texture pipeline.

Aspect 18 is the method of any of aspects 1-17 and includes that outputting the indication of the adjusted value of the filtered texture sample includes: transmitting, to a component at a graphics processing unit (GPU) or a central processing unit (CPU), the indication of the adjusted value of the filtered texture sample.

Aspect 19 is the method of any of aspects 1-18 and includes that outputting the indication of the adjusted value of the filtered texture sample includes: storing, in a memory or a cache at a graphics processor or a central processing unit (CPU), the indication of the adjusted value of the filtered texture sample.

Aspect 20 is an apparatus for graphics processing including at least one processor coupled to a memory and configured to implement a method as in any of aspects 1-19.

Aspect 21 may be combined with aspect 20 and includes that the apparatus is a wireless communication device including at least one of a transceiver or an antenna coupled to the at least one processor, where to obtain the set of texture samples, the at least one processor is configured to obtain the set of texture samples via at least one of the transceiver or the antenna.

Aspect 22 may be combined with aspect 20 or 21 and includes that the at least one processor includes a texture block in a texture pipeline, where the texture block is configured to implement a method as in any of aspects 1-19.

Aspect 23 is an apparatus for graphics processing including means for implementing a method as in any of aspects 1-19.

Aspect 24 is a computer-readable medium (e.g., a non-transitory computer-readable medium) storing computer executable code, the computer executable code, when executed by at least one processor, causes the at least one processor to implement a method as in any of aspects 1-19.

Various aspects have been described herein. These and other aspects are within the scope of the following claims.

What is claimed is:

1. An apparatus for graphics processing, comprising:
a memory; and
at least one processor coupled to the memory and, based at least in part on information stored in the memory, the at least one processor is configured to:
perform a filtering operation on a set of texture samples;
select, during a single sampling operation, a minimum value and a maximum value associated with the set of texture samples during the performance of the filtering operation on the set of texture samples;
adjust, during the single sampling operation, a value of a filtered texture sample associated with the set of texture samples based on the minimum value and the maximum value; and
output an indication of the adjusted value of the filtered texture sample.

2. The apparatus of claim 1, where the at least one processor is configured to:
remove or mitigate a ringing artifact associated with the filtering operation, wherein to remove or mitigate the ringing artifact, the at least one processor is configured to remove or mitigate the ringing artifact based on the minimum value and the maximum value.

3. The apparatus of claim 1, wherein the at least one processor comprises a texture block in a texture pipeline, and wherein the texture block is configured to perform the filtering operation, select the minimum value and the maximum value, adjust the value of the filtered texture sample, and output the indication of the adjusted value of the filtered texture sample.

4. The apparatus of claim 1, where the at least one processor is configured to:
obtain the set of texture samples prior to the performance of the filtering operation on the set of texture samples, wherein to select the minimum value and the maximum value, the at least one processor is configured to select the minimum value and the maximum value based on the obtained set of texture samples.

5. The apparatus of claim 4, wherein the apparatus comprises a wireless communications device including at least one of a transceiver or antenna coupled to the at least one processor, and wherein to obtain the set of texture samples, the at least one processor is configured to obtain the set of texture samples via at least one of the transceiver or the antenna.

6. The apparatus of claim 4, wherein to obtain the set of texture samples, the at least one processor is configured to sample a texture at one or more locations in the single sampling operation.

7. The apparatus of claim 1, wherein to adjust the value of the filtered texture sample, the at least one processor is configured to: clamp the value of the filtered texture sample at a texture pipeline of a graphics processor or a shader processor (SP) of the graphics processor.

8. The apparatus of claim 7, wherein to adjust the value of the filtered texture sample, the at least one processor is configured to clamp the value of the filtered texture sample at the texture pipeline, wherein to output the indication of the adjusted value of the filtered texture sample, the at least one processor is configured to transmit the indication from the texture pipeline to the SP.

9. The apparatus of claim 7, wherein to adjust the value of the filtered texture sample, the at least one processor is configured to clamp the value of the filtered texture sample at the SP, wherein the at least one processor is further configured to:
output a second indication of the minimum value and the maximum value to the SP.

10. The apparatus of claim 1, wherein each texture sample in the set of texture samples comprises a texel, a texture pixel, or a texture element.

11. The apparatus of claim 1, wherein the filtering operation comprises at least one of: bicubic filtering or user-defined filtering.

12. The apparatus of claim 1, wherein to adjust the value of the filtered texture sample, the at least one processor is configured to: set the value of the filtered texture sample to the minimum value, set the value of the filtered texture sample to the maximum value, set the value of the filtered texture sample to the value of the filtered texture sample, return the value of the filtered texture sample, or refrain from changing the value of the filtered texture sample.

13. The apparatus of claim 12, wherein a first value of a first filtered texture sample associated with the set of texture samples is less than the minimum value, and wherein to adjust the first value, the at least one processor is configured to set the first value to the minimum value based on the first value being less than the minimum value.

14. The apparatus of claim 12, wherein a first value of a first filtered texture sample associated with the set of texture samples is greater than the maximum value, and wherein to adjust the first value, the at least one processor is configured to set the first value to the maximum value based on the first value being greater than the maximum value.

15. The apparatus of claim 12, wherein a first value of a first filtered texture sample associated with the set of texture samples is greater than the minimum value and less than the maximum value, and wherein to adjust the first value, the at least one processor is configured to: set the first value to the first value, return the first value, or refrain from changing the first value based on the first value being greater than the minimum value and less than the maximum value.

16. The apparatus of claim 1, wherein a first value of a first filtered texture sample associated with the set of texture samples is outside of a range defined by the minimum value and the maximum value due to the at least one processor being configured to perform the filtering operation on the set of texture samples.

17. The apparatus of claim 1, wherein to perform the filtering operation on the set of texture samples, the at least one processor is configured to apply at least one weight to the set of texture samples, and wherein to adjust the value of the filtered texture sample, the at least one processor is configured to adjust the value of the filtered texture sample further based on the at least one weight.

18. The apparatus of claim 17, wherein the at least one weight is associated with at least one of a shader or a calculated value associated with a texture pipeline.

19. The apparatus of claim 1, wherein to output the indication of the adjusted value of the filtered texture sample, the at least one processor is configured to: transmit, to a component at a graphics processor or a central processing unit (CPU), the indication of the adjusted value of the filtered texture sample.

20. The apparatus of claim 1, wherein to output the indication of the adjusted value of the filtered texture sample, the at least one processor is configured to: store, in the memory or a cache at a graphics processor or a central processing unit (CPU), the indication of the adjusted value of the filtered texture sample.

21. A method of graphics processing, comprising:
performing a filtering operation on a set of texture samples;
selecting, during a single sampling operation, a minimum value and a maximum value associated with the set of texture samples during the performance of the filtering operation on the set of texture samples;
adjusting, during the single sampling operation, a value of a filtered texture sample associated with the set of texture samples based on the minimum value and the maximum value; and
outputting an indication of the adjusted value of the filtered texture sample.

22. The method of claim 21, further comprising:
removing or mitigating a ringing artifact associated with the filtering operation, wherein the ringing artifact is removed or mitigated based on the minimum value and the maximum value.

23. The method of claim 21, wherein the performance of the filtering operation, the selection of the minimum value and the maximum value, and the adjustment of the value of the filtered texture sample are performed at a texture block in a texture pipeline.

24. The method of claim 21, further comprising:
obtaining the set of texture samples prior to the performance of the filtering operation on the set of texture samples, wherein the minimum value and the maximum value are selected based on the obtained set of texture samples.

25. The method of claim 24, wherein obtaining the set of texture samples comprises sampling a texture at one or more locations in the single sampling operation.

26. The method of claim 21, wherein adjusting the value of the filtered texture sample comprises: clamping the value of the filtered texture sample at a texture pipeline or a shader processor (SP) of a graphics processor.

27. The method of claim 26, wherein the value of the filtered texture sample is clamped at the texture pipeline, wherein outputting the indication of the adjusted value of the filtered texture sample comprises: transmitting the indication from the texture pipeline to the SP.

28. The method of claim 26, wherein the value of the filtered texture sample is clamped at the SP, further comprising:
outputting a second indication of the minimum value and the maximum value to the SP.

29. The method of claim 21, wherein each texture sample in the set of texture samples comprises a texel, a texture pixel, or a texture element.

30. A non-transitory computer-readable medium storing computer executable code, the computer executable code, when executed by at least one processor, causes the at least one processor to:
perform a filtering operation on a set of texture samples;
select, during a single sampling operation, a minimum value and a maximum value associated with the set of texture samples during the performance of the filtering operation on the set of texture samples;
adjust, during the single sampling operation, a value of a filtered texture sample associated with the set of texture samples based on the minimum value and the maximum value; and
output an indication of the adjusted value of the filtered texture sample.

* * * * *